(12) United States Patent
Yabe et al.

(10) Patent No.: US 8,599,332 B2
(45) Date of Patent: Dec. 3, 2013

(54) LIGHT GUIDE PLATE AND LIQUID CRYSTAL DISPLAY DEVICE

(75) Inventors: Mamoru Yabe, Sakado (JP); Yoshihiro Ueno, Kusatsu (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 284 days.

(21) Appl. No.: 13/032,720

(22) Filed: Feb. 23, 2011

(65) Prior Publication Data

US 2011/0222000 A1 Sep. 15, 2011

(30) Foreign Application Priority Data

Mar. 12, 2010 (JP) ................................. 2010-056729

(51) Int. Cl.
*G02F 1/1335* (2006.01)

(52) U.S. Cl.
USPC ............... 349/65; 349/64; 349/187; 362/612; 362/615; 362/621

(58) Field of Classification Search
USPC ........ 349/65, 64, 57, 187; 362/615, 621, 612, 362/613, 611, 617, 97.1, 97.2, 339
See application file for complete search history.

(56) References Cited

U.S. PATENT DOCUMENTS

| | | | |
|---|---|---|---|
| 6,607,281 B2 | 8/2003 | Ono et al. | |
| 6,913,366 B2 * | 7/2005 | Lee | 362/628 |
| 8,164,708 B2 | 4/2012 | Kim et al. | |
| 2002/0180923 A1 * | 12/2002 | Aoyagi et al. | 349/149 |
| 2007/0019439 A1 * | 1/2007 | Yu et al. | 362/621 |

FOREIGN PATENT DOCUMENTS

| | | |
|---|---|---|
| CN | 1388401 A | 1/2003 |
| JP | 2001184925 A | 7/2001 |
| JP | 2002082625 A | 3/2002 |
| JP | 2002350850 A | 12/2002 |
| KR | 2007-0000081 A | 1/2007 |

OTHER PUBLICATIONS

Korean Examination Report with translation for Application No. 2011-0005741, mailed Mar. 20, 2012 (10 pages).
Chinese Examination Report for Chinese Application No. 201110044664.4, Dated Jun. 5, 2012 (12 Pages With Machine Translation).
Chinese Office Action issued in Chinese Application No. 201110044664.4, dated Jan. 16, 2013, and translation thereof (10 pages).

* cited by examiner

*Primary Examiner* — Thoi Duong
(74) *Attorney, Agent, or Firm* — Osha Liang LLP

(57) ABSTRACT

A light guide plate has a light incident surface arranged facing a plurality of point light sources arrayed in a line, a light exit surface orthogonal to the light incident surface, and two side surfaces orthogonal to the light incident surface and the light exit surface. Light from the plurality of point light sources introduced from the light incident surface is diffused by a diffusion unit arranged on the light exit surface or a surface facing the light exit surface. The light diffused by the diffusion unit is exited from the light exit surface. A distance between a point light source positioned at an end of the plurality of point light sources and the light incident surface is different from a distance between a point light source not positioned at the end of the plurality of point light sources and the light incident surface.

20 Claims, 20 Drawing Sheets

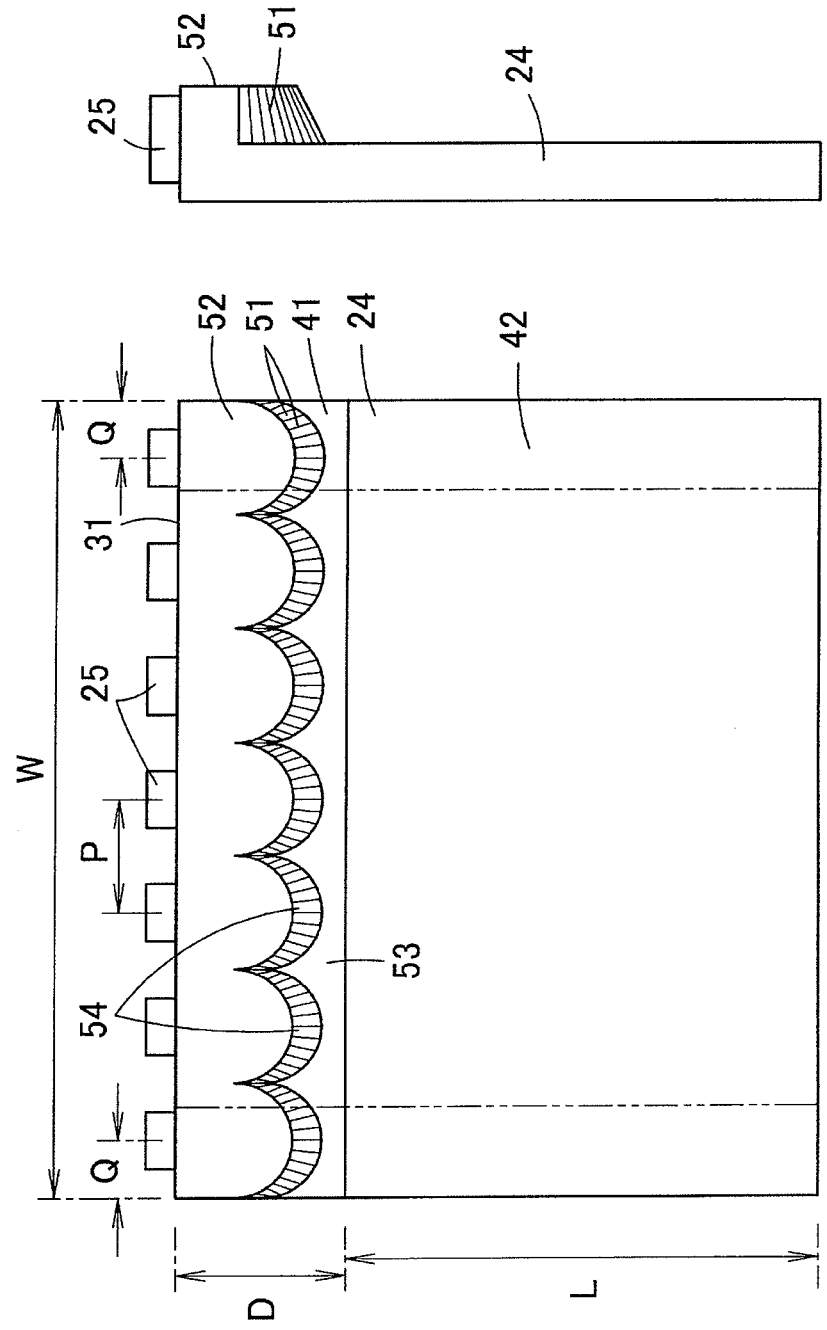

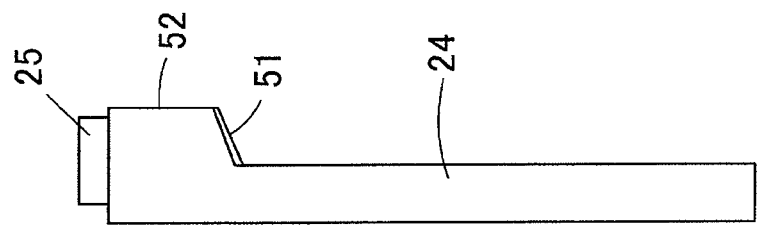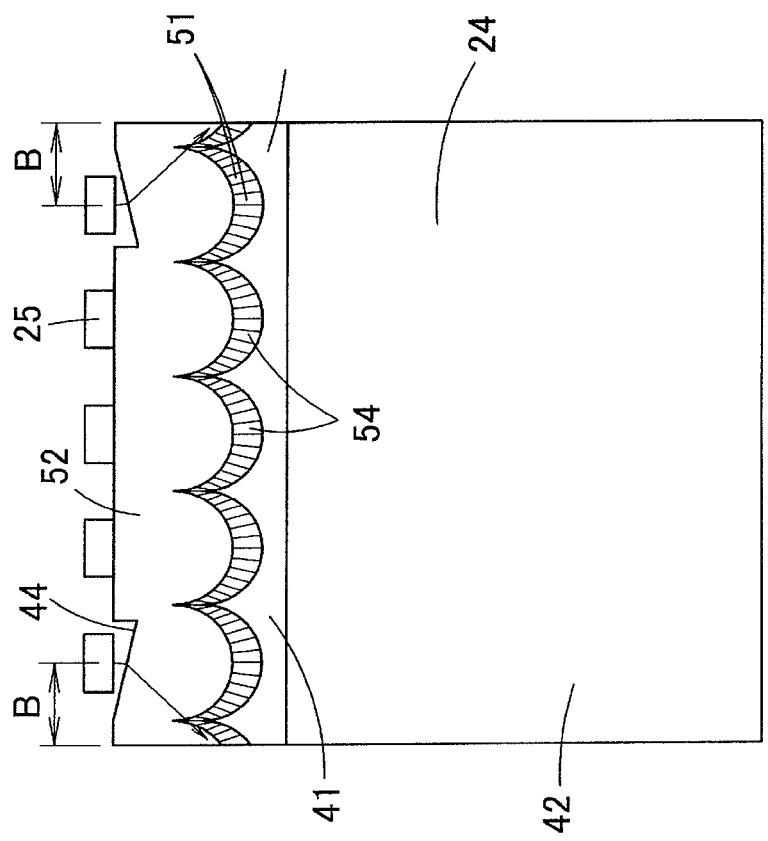

LIGHT GUIDE PLATE AND LIQUID CRYSTAL DISPLAY DEVICE

BACKGROUND OF THE INVENTION

1. Technical Field

The present invention relates to light guide plates and liquid crystal display devices. Specifically, the present invention relates to a light guide plate used in a backlight or the like, and a liquid crystal display device in which the light guide plate is used in an area light source device such as a backlight.

2. Related Art

An area light source device used as a backlight of a liquid crystal panel is disclosed in Japanese Unexamined Patent Publication No. 2002-82625. The area light source device disclosed in Japanese Unexamined Patent Publication No. 2002-82625 is shown in FIG. 1.

In such an area light source device, a corner of a rectangular light guide plate 11 is cut diagonally or an edge of the light guide plate 11 is cut to a V-groove shape to form an inclined surface 12 that is diagonally inclined, and a light source 13 having high directivity is arranged to face each inclined surface 12. In Japanese Unexamined Patent Publication No. 2002-82625, such a configuration prevents a bright portion and a dark portion from alternately occurring at a surface of the light guide plate thereby causing luminance unevenness even when the light source having high directivity is used.

However, in the backlight (area light source device) used in the liquid crystal panel of a portable telephone or the like, the size and the aspect ratio of a light emitting surface differ depending on the individual model. Furthermore, the dimension of the light emitting surface actually generally differs by a little bit even with the light emitting surface size of the same type. (e.g., the dimension of the light emitting surface slightly differs depending on the model of the portable telephone even with the same size of three inches).

Thus, in the backlight of such an application, the dimension of the light guide plate and the arrangement of the light source needed to be optimized each time when designing the individual model when the light emitting surface size is different, of course, and also when the light emitting surface size is the same. When the arrangement of the light source changes, an optical pattern provided on the back surface of the light guide plate needed to be re-designed so that the light emitting luminance becomes even. Therefore, the design of the light guide plate needed to be redone with enormous cost and time when forming the backlight of different size.

Furthermore, since the light guide plate of the backlight is a resin molded article and is normally manufactured by injection molding, a dedicated molding die needs to be formed every time when the outer shape dimension of the light guide plate or the light emitting surface size is even slightly different. Furthermore, when newly forming the molding die, the density, shape, or the like of the optical pattern formed in the die piece of the back surface of the light guide plate needs to be adjusted each time so that an even light emitting luminance can be obtained. A great amount of trouble and time are thus required to form the die, and an enormous cost is also necessary.

SUMMARY

One or more embodiments of the present invention provides a light guide plate of a size corresponding to a request by preparing an original light guide plate and cutting the original light guide plate according to the application, the light guide plate enabling the luminance distribution of the light emitting surface to be even. One or more embodiments of the present invention also provides a liquid crystal display device in which the light guide plate is used in an area light source device.

A first light guide plate according to one or more embodiments of the present invention relates to a light guide plate including a light incident surface arranged facing a plurality of point light sources arrayed in a line, a light exit surface orthogonal to the light incident surface, and two side surfaces orthogonal to the light incident surface and the light exit surface, light from the point light source introduced from the light incident surface being diffused by a diffusion unit arranged on the light exit surface or a surface facing the light exit surface, and the light diffused by the diffusion unit being exited from the light exit surface; wherein a distance between a point light source positioned at an end of the plurality of point light sources and the light incident surface is different from a distance between a point light source not positioned at the end of the plurality of point light sources and the light incident surface.

In the first light guide plate according to one or more embodiments of the present invention, the luminance at a corner of the light emitting surface and the luminance at the region outside thereof can be adjusted and the luminance at the corner of the light emitting surface and the luminance at the region outside thereof can be made equal since the distance between a point light source positioned at the end of the plurality of point light sources and the light incident surface is different from the distance between a point light source not positioned at the end of the plurality of point light sources and the light incident surface. Therefore, according to the light guide plate according to one or more embodiments of the present invention, the luminance distribution of the light emitting surface can be evened and the luminance unevenness can be prevented.

A second light guide plate according to one or more embodiments of the present invention relates to a light guide plate being planned to be used with one side surface or both side surfaces cut, and being even designed in advance to obtain an even luminance in an effective light emitting region when arranged with a light incident surface facing a plurality of point light sources arrayed in a line; wherein an error from an even luminance in the effective light emitting region produced by cutting one side surface or both side surfaces is corrected by differing a distance between a point light source positioned at the end of the plurality of point light sources and the light incident surface from the distance before the cutting.

In the second light guide plate according to one or more embodiments of the present invention, the light guide plate of an arbitrary dimension smaller than an original light guide plate can be easily formed by cutting the original light guide plate. In other words, as long as there is an original light guide plate, the light guide plate of various sizes can be easily formed by simply changing the cutting shape from the original light guide plate without newly forming a light guide plate die in particular. Furthermore, as the distance between the point light source positioned at the end of the plurality of point light sources and the light incident surface is differed from the distance before the cutting although the original light guide plate is cut to an arbitrary dimension, the luminance distribution at the light emitting surface of the cut light guide plate can be evened. Therefore, the due date of the light guide plate can be shortened and the cost of the light guide plate can be reduced. Moreover, the design changes at the product development stage can be flexibly responded. In addition, the backlight of various sizes can be formed with one type of light guide plate, which is the original, and a backlight having even brightness can be obtained.

In a first or second light guide plate according to one or more embodiments of the present invention, the distance between the point light source positioned at the end and the light incident surface is differed according to a distance from the point light source positioned at the end to a side surface close to the point light source. Accordingly, the direction of the light entered to areas where the distance between the point light source positioned at the end and the light incident surface is different can be controlled, and the luminance distribution of the light emitting surface can be evened.

In a first or second light guide plate according to one or more embodiments of the present invention, the distance between the point light source positioned at the end and the light incident surface is greater than the distance between the point light source not positioned at the end of the plurality of point light sources and the light incident surface. Accordingly, the brightness at the corner of the light emitting surface can be lowered, and hence it is effective when the distance between the point light source at the end and the side surface of the light guide plate (hereinafter referred to as overhanging distance) is shorter than the overhanging distance (hereinafter referred to as appropriate overhanging distance) of when an even luminance distribution is obtained when the light incident surface is not processed and is straight.

In a first or second light guide plate according to one or more embodiments of the present invention, the distance between the point light source positioned at the end and the light incident surface is smaller than the distance between the point light source not positioned at the end of the plurality of point light sources and the light incident surface. Accordingly, it is effective when the overhanging distance is longer than the appropriate overhanging distance since the brightness at the corner of the light emitting surface can be increased.

In a first or second light guide plate according to one or more embodiments of the present invention, the distance between the point light source positioned at the end and the light incident surface becomes greater toward a side surface close to the point light source. Accordingly, it is effective when the overhanging distance is shorter than the appropriate overhanging distance since the brightness at the corner of the light emitting surface can be lowered.

In a first or second light guide plate according to one or more embodiments of the present invention, the distance between the point light source positioned at the end and the light incident surface becomes smaller toward a side surface close to the point light source. Accordingly, it is effective when the overhanging distance is longer than the appropriate overhanging distance since the brightness at the corner of the light emitting surface can be increased.

In a first or second light guide plate according to one or more embodiments of the present invention, a position where the distance between the point light source positioned at the end and the light incident surface starts to change is within a region of the light incident surface facing a light emitting surface of the point light source positioned at the end. Accordingly, one part of the light emitted from the point light source at the end is used as a normal point light source and the other light is used to adjust the luminance unevenness.

In a first or second light guide plate according to one or more embodiments of the present invention, a position where the distance between the point light source positioned at the end and the light incident surface starts to change is a position farther away from a side surface close to the point light source than a region of the light incident surface facing a light emitting surface of the point light source positioned at the end. Accordingly, all the light emitted from the point light source at the end can be used to adjust the luminance unevenness, and the effect of adjusting the luminance unevenness becomes higher.

In a first or second light guide plate according to one or more embodiments of the present invention, the plurality of point light sources are all directed in the same direction and area arranged on the same straight line. Accordingly, the light emitted from each point light source can be easily controlled.

In a first or second light guide plate according to one or more embodiments of the present invention, the distance between the point light source positioned at the end and the light incident surface is defined so that an angle when an upper surface and a lower surface of the light incident surface are seen from the point light source is narrower than a spread angle of the light emitted from the point light source at a cross-section perpendicular to the light incident surface and the light exit surface. Accordingly, it is effective when the overhanging distance is shorter than the appropriate overhanging distance since the amount of light that enters the light guide plate can be reduced to suppress the brightness at the relevant area.

In a first or second light guide plate according to one or more embodiments of the present invention, the light guide plate is cut to a desired dimension through an extracting construction method. Accordingly, the cutting to adjust the dimension of the light guide plate and the processing of the light incident surface or the like to even the luminance can be carried out all at once, thereby enhancing mass production of the light guide plate.

A liquid crystal display device according to one or more embodiments of the present invention relates to a liquid crystal display device including an area light source device including a first or second light guide plate according to one or more embodiments of the present invention and a plurality of point light sources arrayed in a line facing the light incident surface of the light guide plate; and a liquid crystal panel arranged on the light exit surface side of the area light source device.

BRIEF DESCRIPTION OF THE DRAWINGS

FIG. 16A is a plan view of the light guide plate according to another embodiment of the present invention, and FIG. 16B is a side view of the light guide plate according to another embodiment;

FIGS. 18A and 18B are a plan view and a side view of the light guide plates having different widths formed with the light guide plate of FIG. 16 as the original;

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Configuration of Area Light Source Device)

Figure 1:
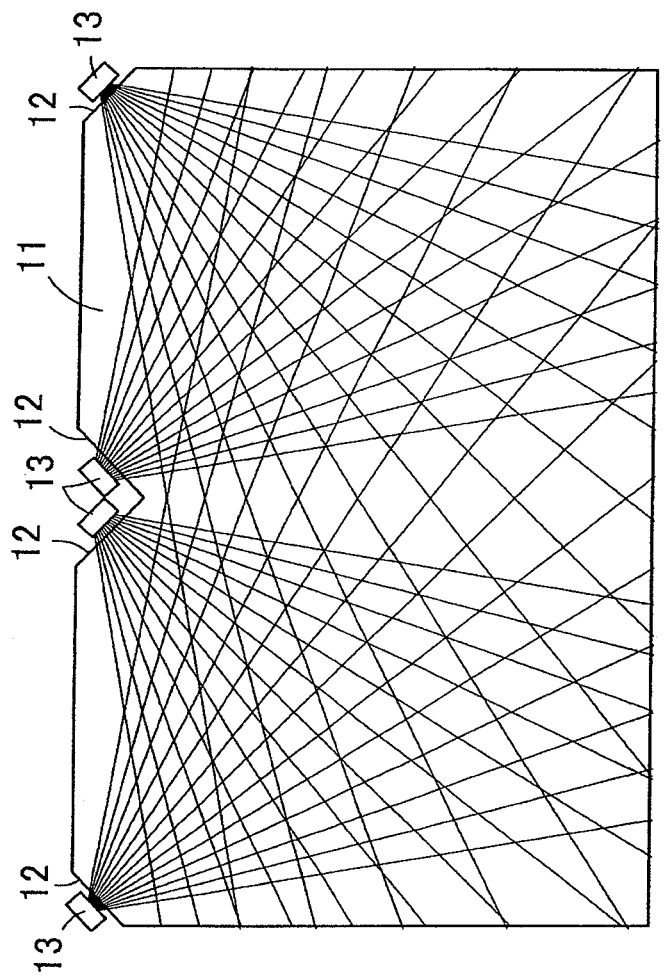
FIG. 1 is a plan view of an area light source device described in Japanese Unexamined Patent Publication No. 2002-82625.
Figure 2:
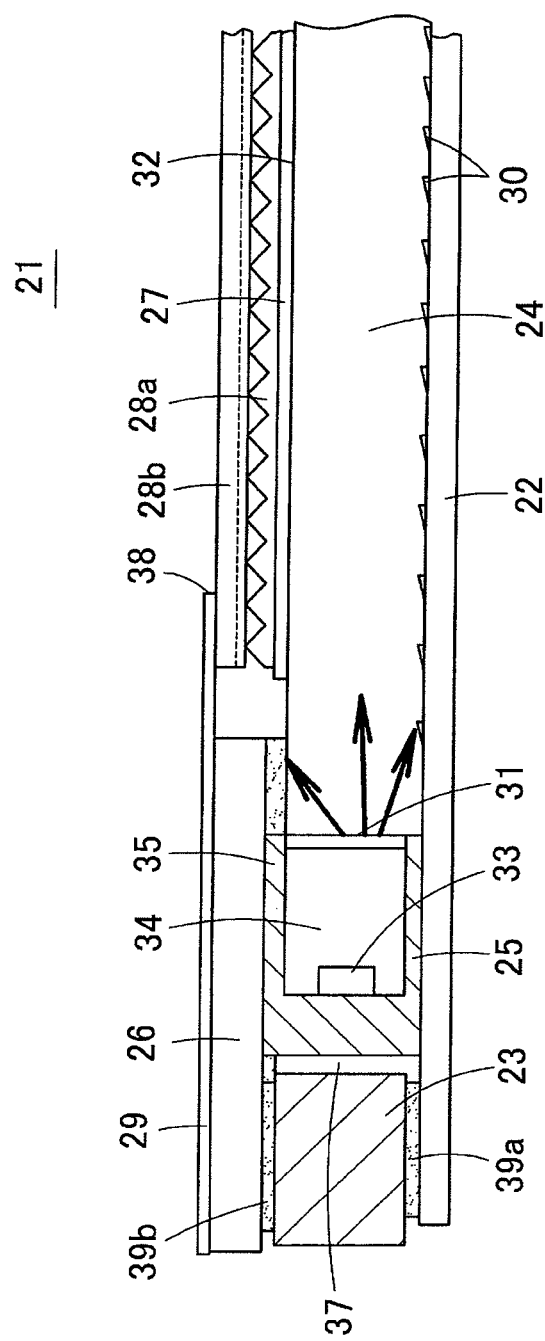
FIG. 2 is a schematic cross-sectional view showing the area light source device according to a first embodiment of the present invention.
Figure 3:
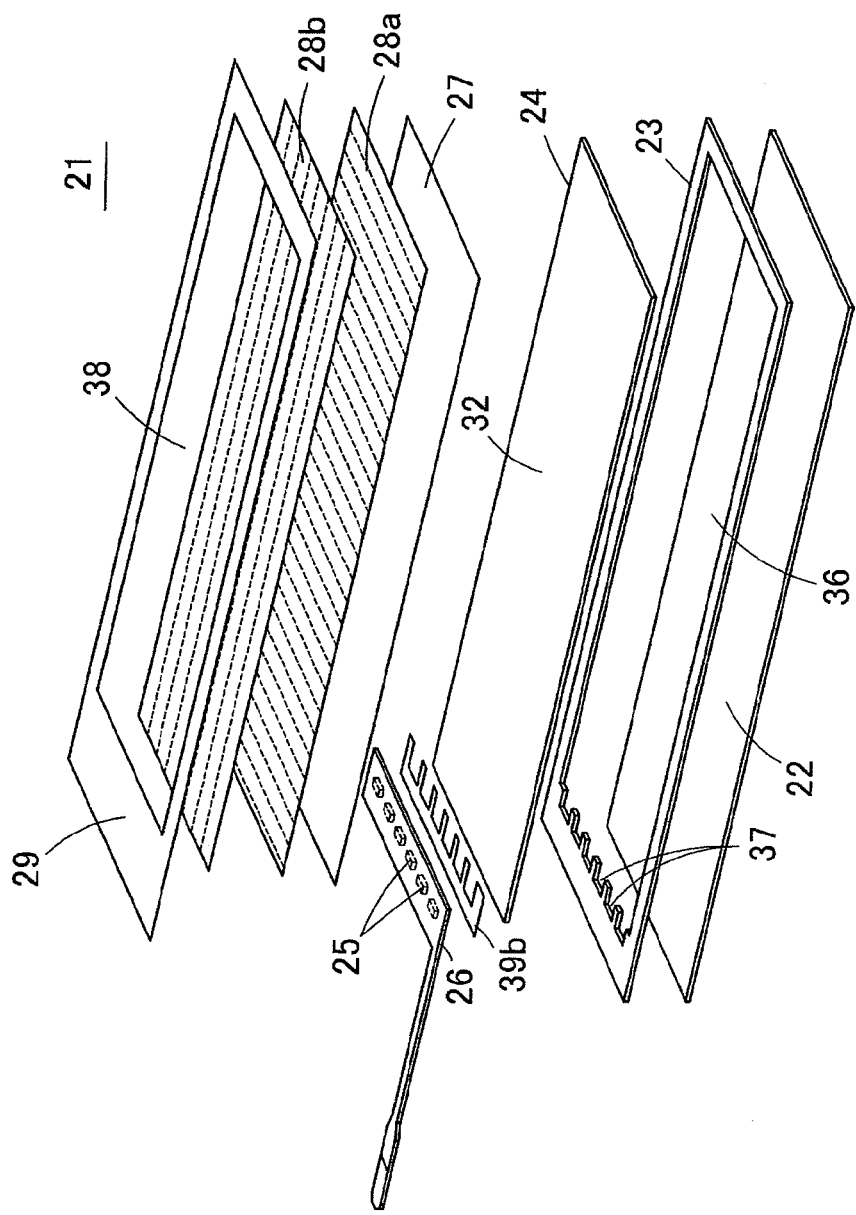
FIG. 3 is an exploded perspective view of the area light source device of the first embodiment.

First, a basic configuration of an area light source device 21 according to one or more embodiments of the present invention will be described with reference to FIG. 2 and FIG. 3. FIG. 2 is a partially broken cross-sectional view of the area light source device 21. FIG. 3 is an exploded perspective view of the area light source device 21.

As shown in FIG. 3, the area light source device 21 includes a reflection plate 22, a frame 23, a light guide plate 24, a plurality of point light sources 25, a flexible print substrate 26, a diffusion plate 27, two prism sheets 28a and 28b, and a light shielding tape 29.

As shown in FIG. 2, the point light source 25 (light emitting element) has the surface excluding the front surface of a resin 34 containing a fluorescent substance covered with a white resin 35. Therefore, when a blue light emitting LED chip 33 emits light, the light is converted to a pseudo-white light by the light emitted from the LED chip 33 and exits to the outside from the front surface (light emitting window) of the resin 34. One part of the light emitted from the LED chip 33 is reflected at the boundary of the transparent resin 34 and the white resin 35, and then exits to the outside from the front surface of the transparent resin 34.

Such point light sources 25 are mounted on the lower surface of the flexible print substrate 26, and are lined in a line at a constant pitch.

The light guide plate 24 is molded to a plate-shape by a translucent resin having high index of refraction such as a polycarbonate resin or a polymethyl methacrylate (PMMA) resin. A light incident surface 31 for introducing light inside the light guide plate 24 is formed at the end face of the light guide plate 24. A great number of microscopic deflection pattern 30 (diffusion unit) for totally reflecting the light guided through the light guide plate 24 and exiting the light to the upper side from the upper surface (light exit surface 32) is formed at the lower surface of the light guide plate 24.

Therefore, the light emitted from the light source 25 is introduced into the light guide plate 24 from the light incident surface 31, and is guided through the light guide plate 24 while repeating total reflection between the upper surface (light exit surface 32) and the lower surface of the light guide plate 24. The light totally reflected or diffused by the deflection pattern 30 in the middle of being guided is exited to the outside from the light exit surface 32.

The frame 23 is obtained by cutting a resin sheet having a thickness of the same extent as the light guide plate 24, and includes an opening 36 for accommodating and positioning the light guide plate 24. A recess 37 for positioning the point light source 25 mounted on the lower surface of the flexible print substrate 26 is arranged at the end of the opening 36 at the same pitch as the point light source 25.

The reflection plate 22 is formed from a material having high reflectance such as a white sheet or metal foil. The reflection plate 22 reflects the light leaked from the lower surface of the light guide plate 24 and reenters the light to the light guide plate 24, thereby enhancing the usage efficiency of the light.

As shown in FIG. 2, the upper surface of the outer peripheral part of the reflection plate 22 is adhered to the lower surface of the frame 23 by a double-sided adhesive tape 39a. The light guide plate 24 is then accommodated in the opening 36 of the frame 23, the point light source 25 is accommodated and positioned in each recess 37 so that the front surface of each point light source 25 faces the light incident surface 31 of the light guide plate 24, and then the lower surface of the flexible print substrate 26 is adhered to the upper surface of the frame 23 and the upper surface of the end of the light guide plate 24 with a double-sided adhesive tape 39b. Therefore, the end of the light guide plate 24 is sandwiched and held by the reflection plate 22 and the flexible print substrate 26.

Furthermore, the diffusion plate 27 and two prism sheets 28a, 28b are mounted in an overlapping manner on the light exit surface 32 of the light guide plate 24, and the edges are held down with the light shielding tape 29. The prism sheets 28a, 28b have a linear prism pattern having a triangular cross-section arranged in parallel at a constant pitch on the surface, where the prism sheets 28a and 28b are overlapped so that the arraying direction of the patterns are orthogonal. The light shielding tape 29 is a black adhesive tape, and a window 38 is opened in the light shielding tape 29 to expose the prism sheet 28b, or the like. The light shielding tape 29 is attached to the upper surface of the flexible print substrate 26 and the edge of the prism sheet 28b, and the diffusion plate 27 and the prism sheets 28a, 28b are held by the light shielding tape 29.

The area light source device 21 is characterized in being resized according to the applying model and the requested size for use. In other words, the area light source device 21 is designed to a relatively large size. Alternatively, it is designed as an assumed largest size. In a case where the area light source device 21 of smaller size is requested, the light guide plate 24 is cut to the requested size. The reflection plate 22, the light guide plate 24, the diffusion plate 27, and the prism sheets 28a, 28b are also cut in accordance with the size of the light guide plate 24. Alternatively, they may be cut from the respective large-sized raw material sheet. The frame 23 and the light shielding tape 29 are cut in accordance with the size of the light guide plate 24 or the like from the raw material sheet by means of a numerical value controlled cutting device. The flexible print substrate 26 mounted with the point light source 25 in which the number of point light sources 25 is different may be held in stock in advance, or may be manufactured after receiving the order.

The reflection plate 22, the diffusion plate 27, and the prism sheets 28a, 28b may be cut to an appropriate size for use and the optical characteristics thereof will not be influenced. However, in the case of the light guide plate 24, the deflection pattern 30 or the like are designed according to the size of the light guide plate 24 and the pitch of the point light source 25 to obtain an even light emitting luminance. Thus, if the light guide plate 24 is cut to an arbitrary size for use, luminance unevenness may occur. Thus, in the area light source device 21 according to one or more embodiments of the present invention, the light guide plate 24 is cut in the following manner when being cut to change the size.

(Configuration of Light Guide Plate and Cutting Method)

Figure 4:
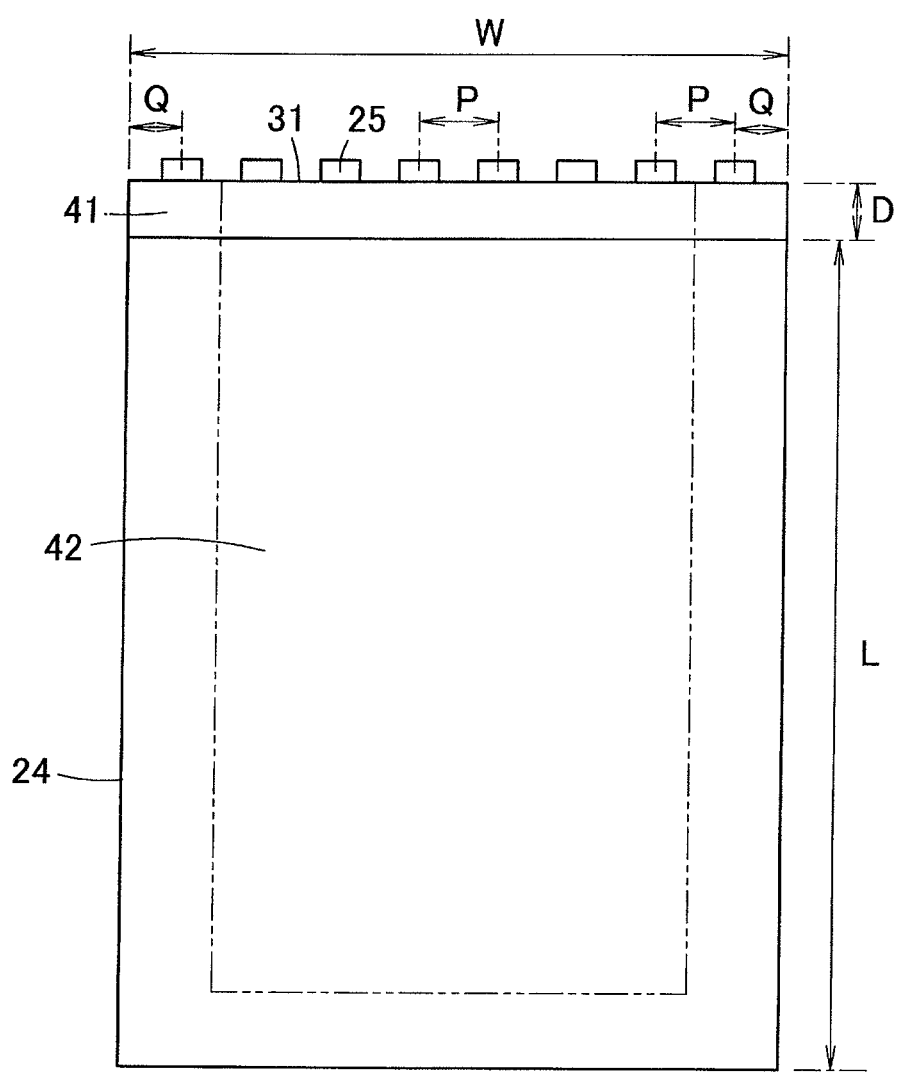
FIG. 4 is a plan view showing the arrangement of the light guide plate and the point light source used in the area light source device of the first embodiment, showing the light guide plate serving as the original when forming the light guide plate of different sizes.

FIG. 4 shows a light guide plate 24, which becomes the original, defined to a slightly large size so that it can be cut for use. The light guide plate 24 has the band-shaped region along the light incident surface 31 as an unused region 41 that is not used as the light emitting surface and the region excluding the unused region 41 of the upper surface of the light guide plate 24 as a light emitting surface 42 (effective light emitting region).

The light guide plate 24 has the deflection pattern 30 or the like designed and adjusted so that the light emitting luminance of the light emitting surface 42 becomes even when the point light source 25 is arranged at a constant pitch P facing the light incident surface 31. Therefore, the deflection pattern 30 may have the same pattern repeated at the pitch equal to the pitch P of the point light source 25 in the width direction of the light guide plate 24. When arranging the diffusion pattern (not shown), or the like for diffusing the light entering the light guide plate 24 and widening the directivity characteristics on the light incident surface 31, such patterns are also arranged at the same pitch P as the point light source 25. Therefore, when the light guide plate 24 is cut, the position to install the point light source 25 after the cutting needs to be the same position as before cutting although the number of point light sources 25 to use may be less.

For instance, in the example shown in FIG. 4, the light guide plate 24 in which the size of the light emitting surface 42 is a width of 50 mm and a length of 58 mm is shown, which is designed so that the luminance distribution of the light emitting surface 42 becomes even when eight point light sources 25 are lined at the pitch P of 6 mm along the light incident surface 31. The light guide plate 24 has a rectangular shape, which width W is 50 mm. Therefore, the distance Q of the point light source 25 at the end and the side surface of the light guide plate 24 is 4 mm. The length D of the unused region 41 is 5 mm, and the length L of the light emitting surface 42 is 58 mm.

The distance (such a distance is hereinafter referred to as overhanging distance) measured in a direction parallel to the light incident surface 31 from the center of the point light source 25 at the end to the side surface of the light guide plate 24 is defined such that the light emitting luminance of the entire light emitting surface 42 becomes even in a rectangular form in the original light guide plate 24. The overhanging distance in the original light guide plate is called an appropriate overhanging distance Q. The appropriate overhanging distance Q changes by the pitch P and the directivity characteristics of the point light source 25, the pattern shape and the arrangement of the deflection pattern 30, and the like, but an optimum value may be determined experimentally in advance. The overhanging distance may differ in left and right, but the left and right overhanging distances are assumed to be the same below.

Figures 7A, 7B, 7C:
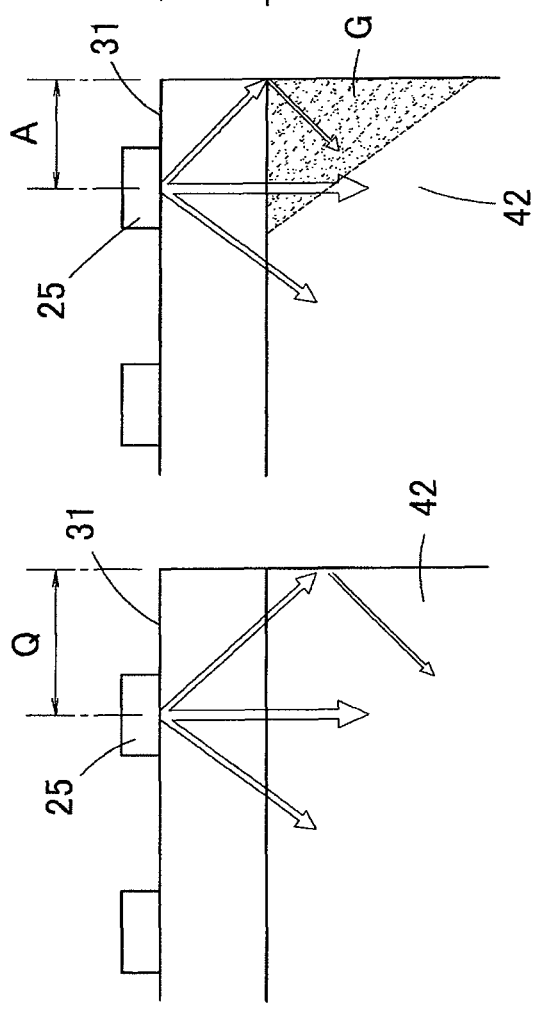
FIGS. 7A, 7B, and 7C are views describing the reason that the corner on the light incident surface side is diagonally cut in the light guide plate of FIG. 6.

In the first embodiment, in a case where the corner of the light guide plate 24 is a rectangular, the region G shown in FIG. 7B becomes too bright when the overhanging distance is ½ (i.e. 3 mm) of the pitch P of the point light source 25. This is because the point light source 25 at the end and the side surface of the light guide plate 24 are close as shown in FIG. 7B, and the amount of light source light reflected at the side surface of the light guide plate 24 becomes large. In this case, therefore, the overhanging distance is set to a certain value greater than P/2 (i.e. appropriate overhanging distance Q. 4 mm in the described example, but the value may change according to the deflection pattern 30 or the like), so that the luminance at the light emitting surface 42 becomes even, as shown in FIG. 7A. In FIGS. 7A to 7C, the thickness of the arrow represents the intensity (amount of light) of the light exited in each direction.

Figure 5:
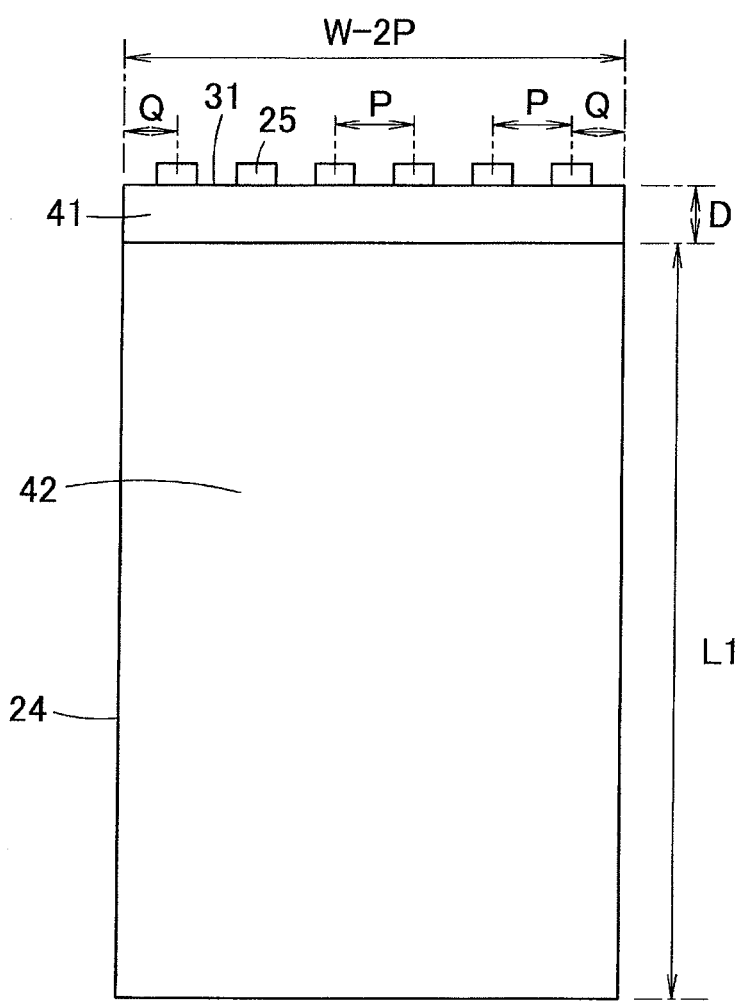
FIG. 5 is a plan view showing a cutting example of the light guide plate shown in FIG. 4.
Figure 6:
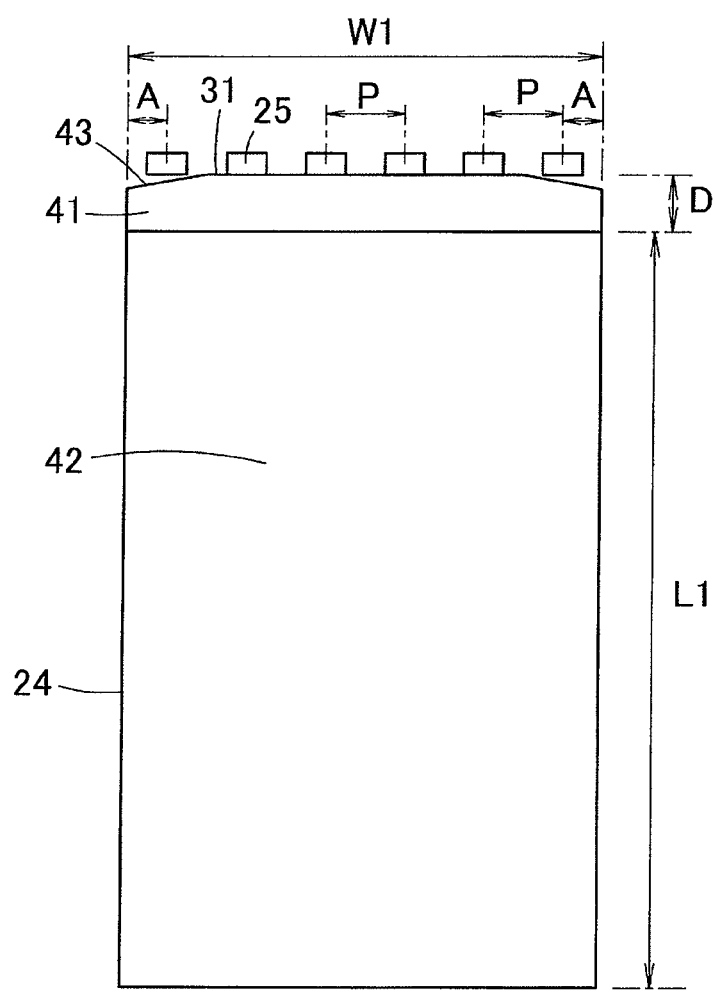
FIG. 6 is a plan view showing another cutting example of the light guide plate shown in FIG. 4.

In FIG. 5 and FIG. 6, the light guide plate 24 of FIG. 4 is cut along a cutting line C shown with a chain double dashed line. In the case of FIG. 5, the width of the light guide plate 24 is shortened by an integral multiples of the pitch P of the point light source 25 (e.g., width is W−2P=38 mm), and the length of the light emitting surface 42 is L1=52 mm. In the case of FIG. 5, the light emitting luminance of the light emitting surface 42 becomes even if the corner is still used in a rectangular shape since the overhanging distance is still equal to the appropriate overhanging distance Q.

In FIG. 6, on the other hand, the light guide plate 24 of FIG. 4 is cut to an arbitrary width. For instance, in the light guide plate 24 of FIG. 6, the number of point light sources 25 is six, the width W1 of the light guide plate 24 is 36 mm, and the length of the light emitting surface 42 is L2=52 mm. Therefore, the overhanging distance A of the light guide plate 24 is 3 mm. However, if the light guide plate 24 is cut to an arbitrarily width, the corner of the light emitting surface 42 becomes too bright or too dark if the corner is a rectangular shape thereby causing luminance unevenness at the light emitting surface 42.

(If Overhanging Distance after Cutting is Shorter than Appropriate Overhanging Distance Q)

If the light guide plate 24 is simply cut, the corner of the light emitting surface 42 becomes too bright when the overhanging distance is shorter than the appropriate overhanging distance Q. For instance, the case of when the overhanging distance is A=3 mm is as described in FIG. 7B. Thus, in the above embodiment, when the overhanging distance is shorter than the appropriate overhanging distance Q, the corner of the light guide plate 24 is cut diagonally at the area facing the light source 25 at the end to form an inclined surface 43, and the inclination angle θ of the inclined surface 43 is adjusted so that the luminance unevenness does not occur at the corner of the light emitting surface 42. The inclined surface 43 is inclined so as to become farther away from an extended line of the light incident surface 31 toward the side end face of the light guide plate 24. The inclination angle θ is an angle formed by the extended line of the light incident surface 31 and the inclined surface 43.

Figure 8:
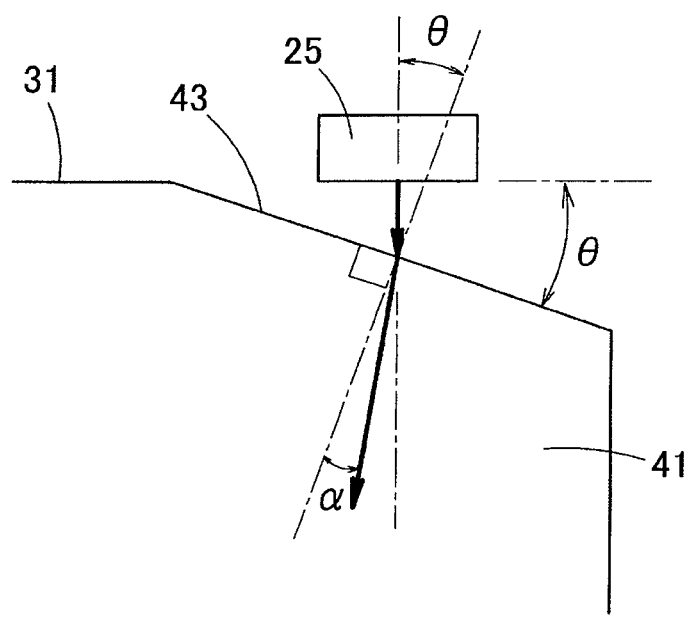
FIG. 8 is a view describing the operation of the inclined surface provided in the light guide plate.
Figure 9:
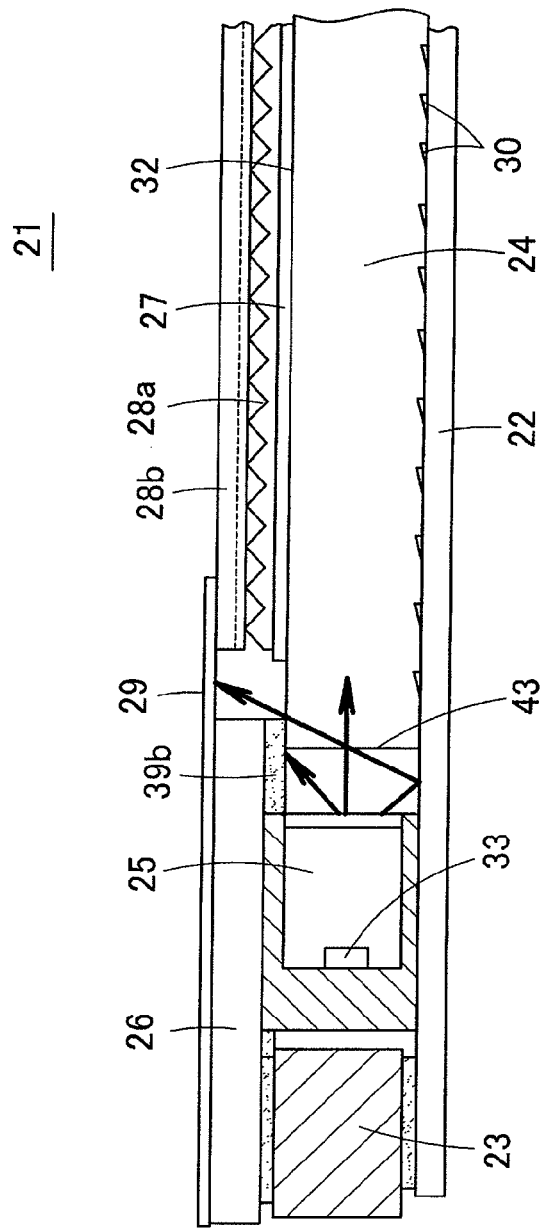
FIG. 9 is a view describing another operation of the inclined surface provided in the light guide plate.

FIG. 8 and FIG. 9 are views describing the reason that the luminance distribution can be evened by providing the inclined surface 43 and suppressing the intensity of light at the corner of the light emitting surface 42. The first reason is that the light exited from the point light source 25 transmits through the inclined surface 43 so that the optical axis direction is bent toward the inner side of the light guide plate 24, as shown with an arrow in FIG. 8. For instance, as shown in FIG. 8, the light exited perpendicularly from the point light source 25 is bent in a direction forming an angle of $$\alpha = \arcsin[(1/n)\sin\theta]$$

with respect to the perpendicular line of the inclined surface 43 according to the Snell's Law, where θ is the inclination angle of the inclined surface 43. Here, n is the index of refraction of the light guide plate 24, where α <θ since n>1. Therefore, as a result of the light advancing toward the corner of the light emitting surface 42 being bent to the inner side, the luminance of the corner of the light emitting surface 42 can be suppressed and the luminance unevenness is less likely to occur.

The second reason is that a space forms between the light exit surface of the point light source 25 and the light guide plate 24 when the inclined surface 43 is formed. In other words, if a space (gap) forms between the light exit surface of the point light source 25 and the inclined surface 43 as a result of providing the inclined surface 43, one part of the light exited from the point light source 25 does not directly enter the light guide plate 24 but is absorbed at the flexible print substrate 26 or the double-sided adhesive tape 39b or is reflected at the reflection plate 22 and then absorbed at the light shielding tape 29, as shown in FIG. 9. As a result, the amount of light that enters the corner of the light emitting surface 42 reduces and the luminance is suppressed, whereby the luminance unevenness is less likely to occur.

The inclination angle θ of the inclined surface 43 needs to be optimized to even the luminance. The optimum inclination angle θ can be experimentally determined. A database of the relationship between the inclination angle θ of the inclined surface 43 and the magnitude of the luminance at the corner of the light emitting surface 42 may be made so that the inclination angle θ can be immediately determined.

Figure 10:
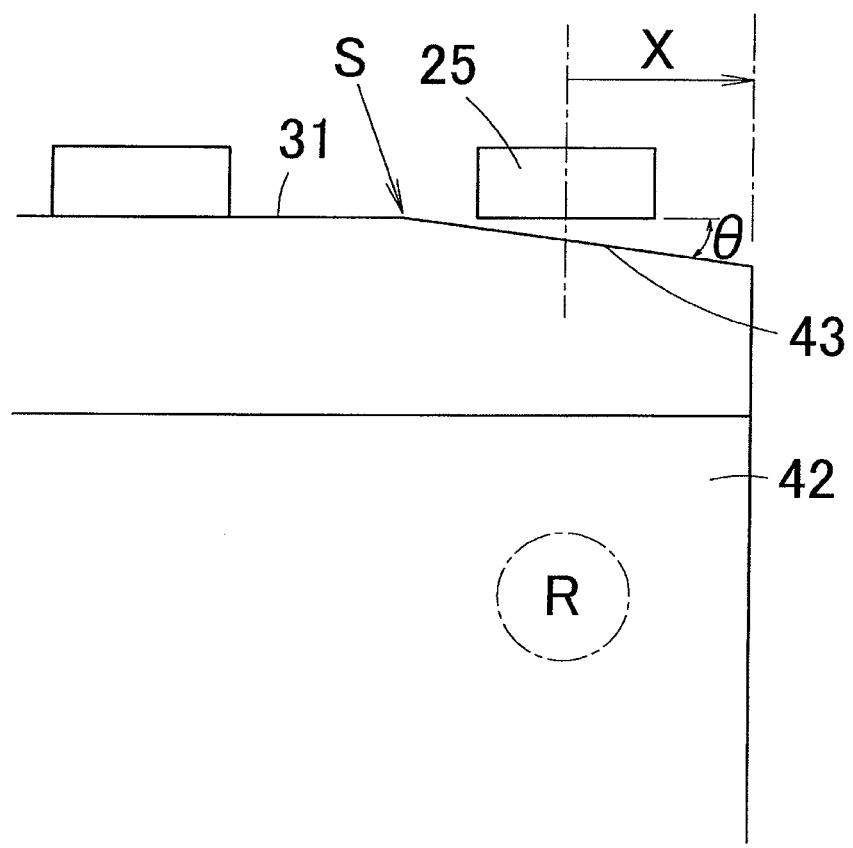
FIG. 10 is a view describing a method of forming a database for determining the inclination angle of the inclined surface.

More specifically, the database may be made in the following manner. First, as shown in FIG. 10, the light guide plate 24 including the inclined surface 43 of a certain inclination angle θ is formed. The overhanging distance X in this case is set to be greater than the appropriate overhanging distance Q. The brightness of the corner (predetermined R region shown in FIG. 10) is measured each time while gradually reducing the overhanging distance X by cutting the side surface of the light guide plate 24. The inclination angle θ may be variously differed with the starting point S of the inclined surface 43 fixed, and the brightness of the R region is again measured while changing the overhanging distance X for the inclined surface 43 of each inclination angle θ. The relationship of the overhanging distance X and the brightness of the R region is obtained even for a case where the inclined surface 43 is not provided (case of θ=0°).

Figure 11:
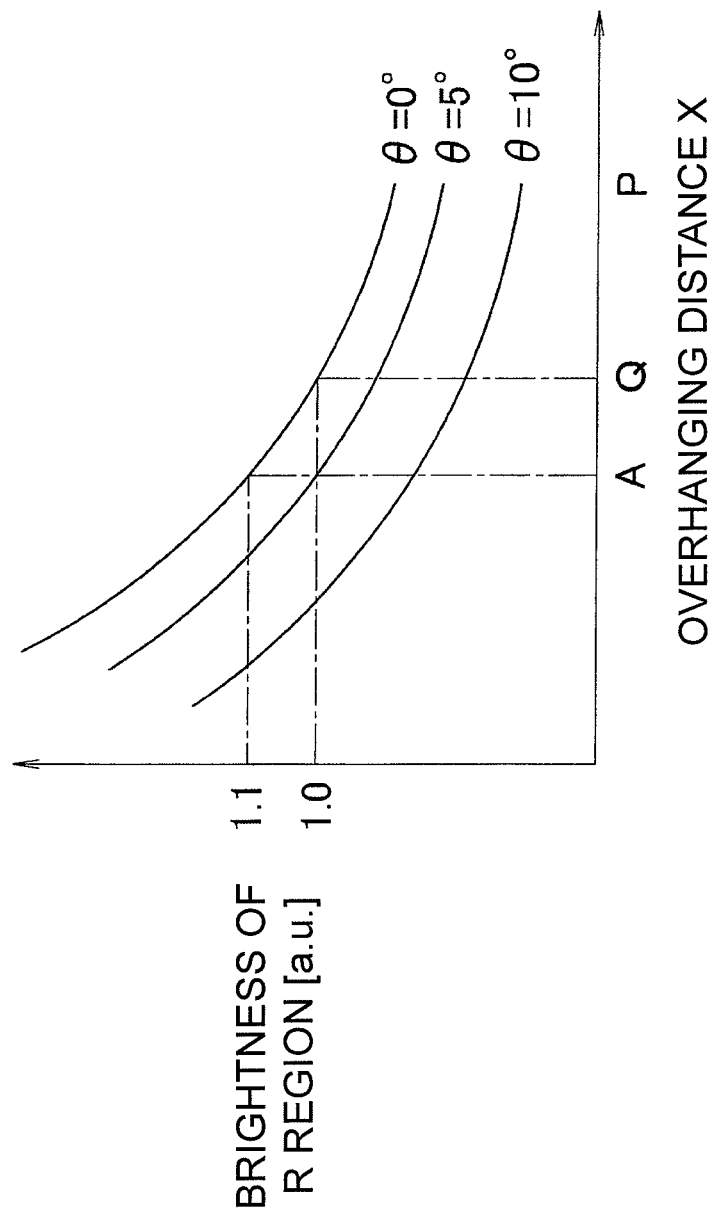
FIG. 11 is a view showing a database for determining the inclination angle of the inclined surface.

Through such measurement, a database showing the relationship of the overhanging distance X and the R region with the inclination angle θ as the parameter can be obtained, as shown in FIG. 11. In FIG. 11, however, the brightness of when the inclined surface 43 does not exist) (θ=0°) and the overhanging distance X is equal to the appropriate overhanging distance Q is normalized to become "1".

The inclination angle can be easily determined in the following manner by preparing such database. For instance, assume the overhanging distance X of the light guide plate 24 after the cut is A (=3 mm). Since the inclination angle is θ=0° if the inclined surface 43 is not provided, the brightness (ratio) of the R region is 1.1 and the brightness is raised 10%, according to FIG. 11. Therefore, the corner of the light emitting surface 42 becomes too bright if the inclined surface 43 is not provided, and hence the brightness needs to be dropped to 1.0 so that the brightness does not change from before the cutting. To this end, the brightness is moved to the point of 1.0 along the line of the overhanging distance X=A in FIG. 11, and the value of the inclination angle θ at the time is read. In the case of FIG. 11, the inclination angle θ of when the overhanging distance is A and the brightness is 1.0 is 5°, and thus the inclined surface 43 having an inclination angle θ of 5° is to be formed when cutting the light guide plate 24.

(Other Methods of Suppressing Brightness)

The method of suppressing the brightness of the corner of the light emitting surface 42 when the overhanging distance X is shorter than the appropriate overhanging distance Q is not limited to one inclined surface 43 as described above. The distance between the light source 25 at the end and the light incident surface 31 typically becomes greater toward the side surface of the light guide plate 24.

Figure 12A:
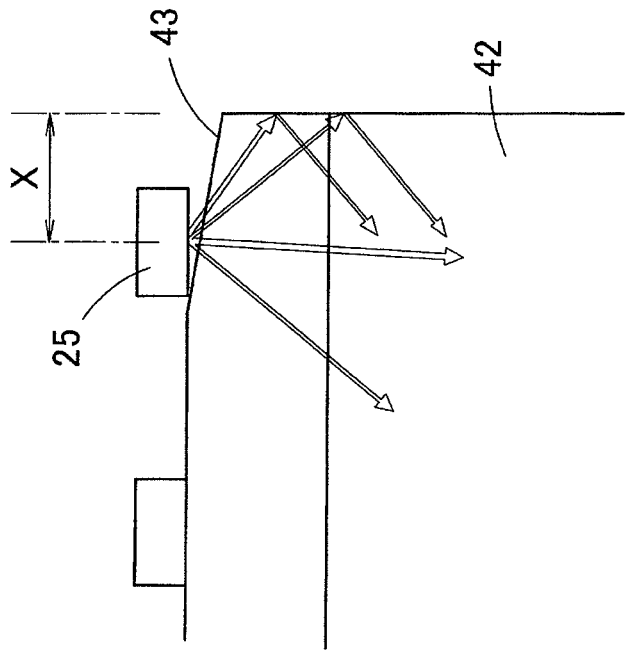
FIG. 12A is a view describing different cutting methods of the corner of the light incident surface side.
Figure 12B:
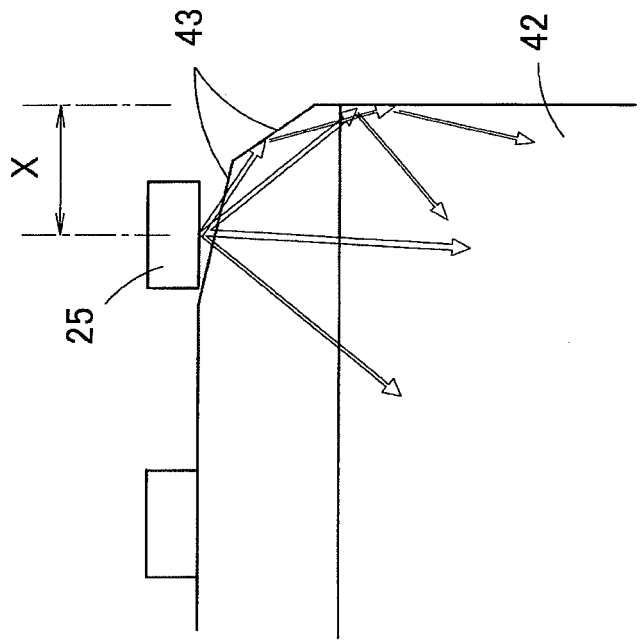
FIG. 12B is a view describing the effect of the cutting methods of FIG. 12A by comparing.

For instance, as shown in FIG. 12A, the corner of the light guide plate 24 may be configured by the inclined surface 43 of a plurality of stages having different inclination angles. The light totally reflected at the inclined surface 43 is reflected in the same direction if only one inclined surface 43 is provided as shown in FIG. 12B, but the direction of the totally reflected light scatters as shown in FIG. 12A if the inclined surface 43 of different inclination angles is provided in plurals, and hence the effect of suppressing the brightness at the corner of the light emitting surface 43 can be enhanced. This means that one inclined surface 43 is provided facing the light source 25 at the end, and in continuation thereto, the inclined surface (43) is also provided at the side surface of the light guide plate 24.

The corner of the light guide plate 24 may be a polygonal shape, or may be curved to a substantially arcuate shape by the curved surface. Although not shown, a small inclined surface 43 is arranged in plurals continuously to form a saw tooth shape at a position facing the light source 25 at the end. As apparent from the description of FIG. 9, the gap between the point light source 25 at the end and the light guide plate 24 is may be simply widened compared to the others.

(If Overhanging Distance after Cutting is Longer than Appropriate Overhanging Distance Q)

If the light guide plate 24 is simply cut, the corner of the light emitting surface 42 becomes dark when the overhanging distance is longer than the appropriate overhanging distance Q, as opposed to the case described above. For instance, when the appropriate overhanging distance Q is 4 mm, the corner becomes dark if the overhanging distance B=5 mm.

Figure 13:
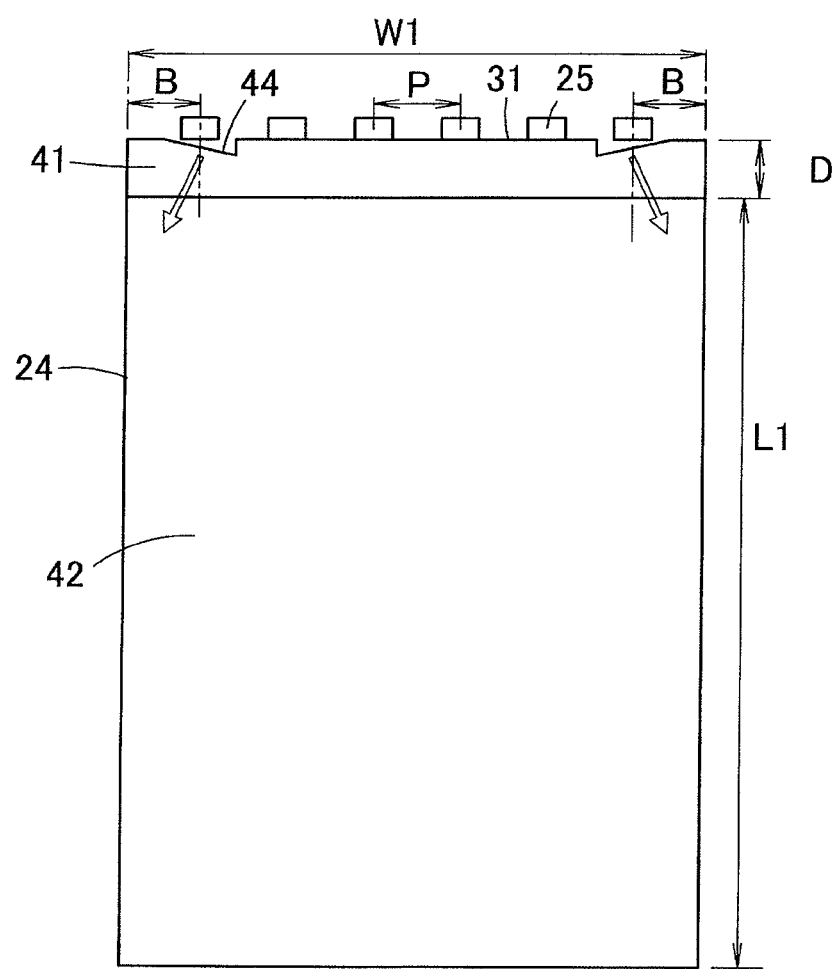
FIG. 13 is a plan view of the light guide plate provided with the reverse inclined surface.

As shown in FIG. 13, if the overhanging distance is longer than the appropriate overhanging distance Q, the vicinity of the light incident surface 31 of the light guide plate 24 is diagonally cut at the position facing the point light source 25 at the end to form a reverse inclined surface 44, and the inclination angle of the reverse inclined surface 44 is adjusted so that the luminance evenness does not occur at the corner of the light emitting surface 42. The reverse inclined surface 44 is inclined so as to become farther away from the extended line of the light incident surface 31 toward the center line of the light guide plate 24.

As shown with an arrow in FIG. 13, the light exited from the point light source 25 at the end is bent toward the corner of the light emitting surface 42 when transmitting the reverse inclined surface 44 by providing the reverse inclined surface 44, so that the amount of light at the corner increases thereby increasing the brightness, and the luminance unevenness is resolved. The method of optimizing the inclination angle of the reverse inclined surface 44 may be similar to the case where the overhanging distance is shorter than the appropriate overhanging distance Q.

The method of compensating for the reduction of the brightness of the corner of the light emitting surface 42 when the overhanging distance X is longer than the appropriate overhanging distance Q is not limited to one reverse inclined surface 44. The distance between the light source 25 at the end and the light incident surface 31 typically becomes smaller toward the side surface of the light guide plate 24.

Figure 14:
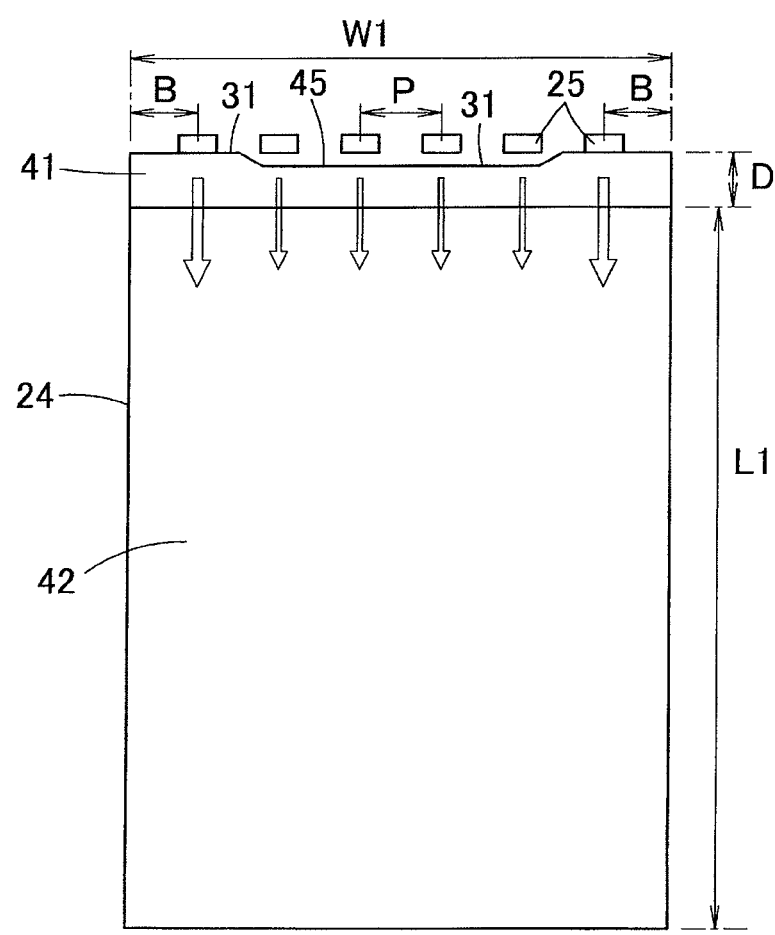
FIG. 14 is a plan view of the light guide plate including the depression.

FIG. 14 shows another countermeasure of when the overhanging distance after cutting is longer than the appropriate overhanging distance Q. In the light guide plate 24 shown in FIG. 14, the point light source 25 at the ends has a short distance with the light incident surface 31 and the other point light source 25 has a relatively long distance with the light incident surface 31 by forming a trapezoidal depression 45 in a region excluding both ends of the light incident surface 31. As described in FIG. 9, the light leaks and the light amount reduces at the relevant area when the gap between the point light source 25 and the light incident surface 31 widens, and thus the corner becomes relatively bright, and the luminance unevenness of the light emitting surface 42 is resolved. The depth of the depression 45 and the angle of the inclined surface at both ends of the depression 45 may be adjusted to adjust the light amount according to the overhanging distance.

According to such a structure, the mechanical holding of the light guide plate by the frame 23 can be securely made since the corner of the light guide plate 24 can be maintained rectangular.

When the overhanging distance after the cutting is shorter than the appropriate overhanging distance Q, as opposed to the mode of FIG. 14, the point light source 25 at both ends has a long distance with the light incident surface 31 and the other point light source 25 has a short distance with the light incident surface 31 by forming a trapezoidal projection in a region excluding both ends of the light incident surface 31.

The method of cutting the light guide plate 24 to the desired size includes cutout processing with a general cutting blade if the light guide plate 24 is thin. The inclined surface 43, the reverse inclined surface 44, the depression 45, or the like can be cut simultaneously with the cutting of the light guide plate 24 by forming the die of the butting blade. Thus, the cutting can be carried out all at once, and mass productivity enhances. The cutout processing can be carried out with a cutter and the like if the number is few.

Figure 15A:
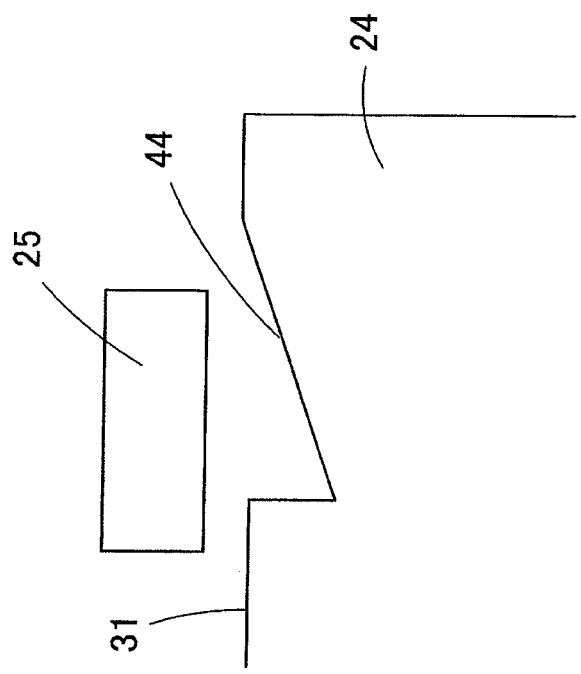
FIG. 15A is a view describing different positions of the inclined surface.
Figure 15B:
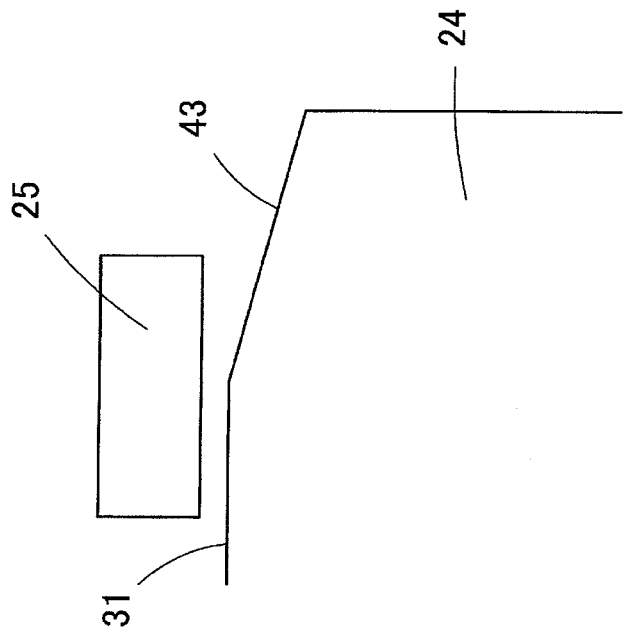
FIG. 15B is a view describing different positions of the reverse inclined surface.

The inclined surface 43 and the reverse inclined surface 44 described above are provided in a range wider than the point light source 25 at the end, but the inclined surface 43 or the reverse inclined surface 44 may start from the middle of the point light source 25 at the end, as shown in FIG. 15A and FIG. 15B. Alternatively, the interval of the pint light source 25 at the end and the light incident surface 31 may change from the middle of the point light source 25 at the end. Accordingly, the portion not facing the inclined surface 43 or 44 of the point light source 25 at the end can be used as the normal point light source, and the portion facing the inclined surface 43 or 44 can be used to adjust the luminance unevenness.

Another Embodiment

Figure 17:
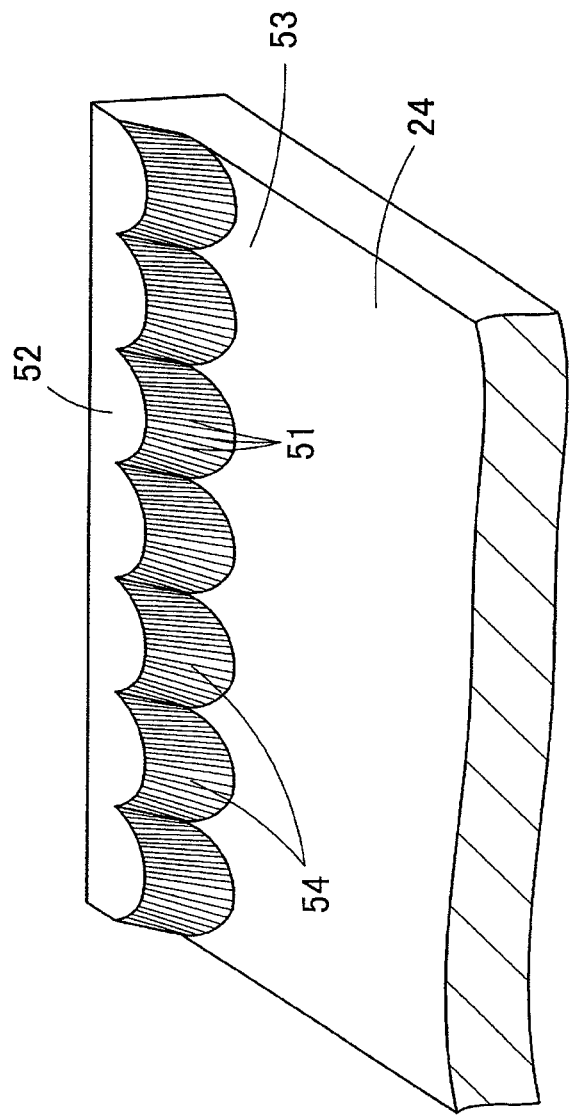
FIG. 17 is a partially broken perspective view of the light guide plate shown in FIG. 16.

FIG. 16 is a plan view showing a light guide plate 24 according to another embodiment of the present invention. The light guide plate 24 also has a plurality of point light sources 25 arrayed in a line at a constant pitch P (e.g., 6 mm) facing the light incident surface 31. In the unused region 41 of the light guide plate 24, the edge region on the light incident surface 31 side is a thick thickness portion 52 having a large thickness, and the region adjacent to the light emitting surface 42 is a thin thickness portion 53 having a thickness same as the light emitting surface 42. A directivity conversion section 54 (structure) is arranged at the position corresponding to each light source 25 at between the thick thickness portion 52 and the thin thickness portion 53. As shown in FIG. 17, the directivity conversion section 54 is a step portion that connects the thick thickness portion 52 and the thin thickness portion 53 and has a shape of ½ of the outer peripheral surface of the circular truncated shape, where a great number of microscopic V-grooves 51 are radially formed on the surface. The appropriate overhanging distance Q is ½ of the pitch P in the original light guide plate 24 (before cutting), and design is made so that luminance unevenness does not occur.

In the light guide plate 24 including the directivity conversion section 54, the height (thickness) of the light incident surface 31 becomes large since the light source 25 is faced at the thick thickness portion 52, so that the light of the light source 25 can be efficiently taken into the light guide plate 24. The thickness of the light guide plate 24 can be thinned in the region of the light emitting surface 42 where the liquid crystal panel or the like is overlapped. Thus, if the light incident side is thick and the thickness of the light guide plate becomes thin from the middle, the light easily leaks to the outside from the step portion thereby lowering the usage efficiency of the light, but the leakage of light can be reduced by changing the directivity of the light that entered the directivity conversion section 54 since a great number of microscopic V-grooves 51 is formed at the directivity conversion section 54 in the light guide plate 24. The operation or the like of the directivity conversion section 54 is disclosed in International Publication WO2008/153024 (PCT/JP2008/060610).

FIG. 18 shows a case where both sides of the light guide plate 24 of FIG. 16 are cut, which cutting is carried out such that the overhanging distance becomes B (e.g., 4 mm) greater than the appropriate overhanging distance Q. The reverse inclined surface 44 is formed at the light incident surface 31 of the light guide plate 24 at the area facing the light source 25 at the end. The inclination angle of the reverse inclined surface 44 is optimized to send the light emitted from the light source 25 at the end to the vicinity of the corner of the light guide plate 24 and even the luminance of the light guide plate 24. In the actual forming example, the luminance of 90% of the luminance of the original light guide plate 24 of FIG. 16 can be achieved if the luminance unevenness is eliminated with B=4 mm.

Figure 19:
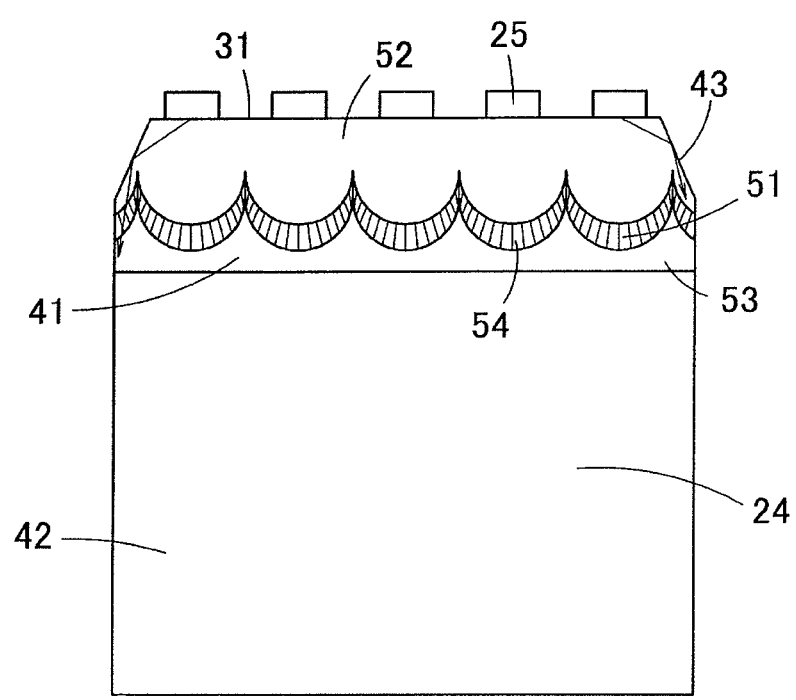
FIG. 19 is a plan view of another light guide plate having different widths formed with the light guide plate of FIG. 16 as the original.

FIG. 19 shows a case where the light guide plate 24 of FIG. 16 is cut such that the overhanging distanced becomes smaller than the appropriate overhanging distance Q. The corner of the light guide plate 24 is then diagonally cut to form the inclined surface 43. The inclination angle of the inclined surface 43 is optimized to totally reflect the light emitted from the light source 25 at the end at the inclined surface 43 thereby guiding the light in the necessary direction, and even the luminance of the light guide plate 24. In the actual forming example, the luminance of 92% of the luminance of the original light guide plate 24 of FIG. 16 can be achieved if the luminance unevenness is eliminated with B=4 mm.

(Variant)

Figure 20A:
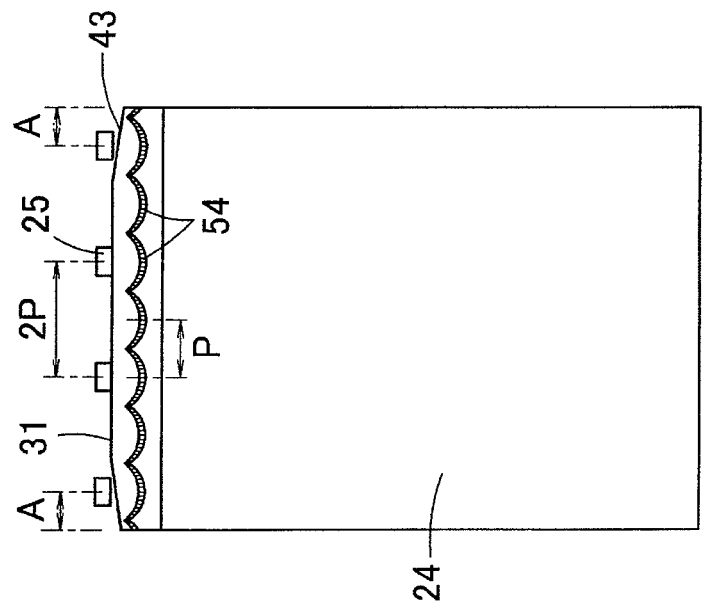
FIGS. 20A and 20B are plan views showing different usage examples of the light guide plate shown in FIG. 16.

In FIG. 20A, the directivity conversion section 54 is arranged at a constant pitch P (e.g., 6 mm), and the light source 25 is designed to be arranged at a pitch of integral multiples thereof (or the directivity conversion section 54 is arranged at a pitch of ½ of the pitch of the light source 25). For instance, in FIG. 20A, the light source 25 is omitted to alternately with respect to the array of the directivity conversion section 54, and it is arrayed at a pitch of 2P (e.g., 12 mm). Since the luminance unevenness is prevented by reducing the number of light sources 25, the density of the deflection pattern 30 is increased between the light sources 25. As a result, an even light emitting luminance is maintained. The appropriate overhanging distance Q is equal to P (e.g., Q=6 mm) in the light guide plate 24.

Figure 20B:
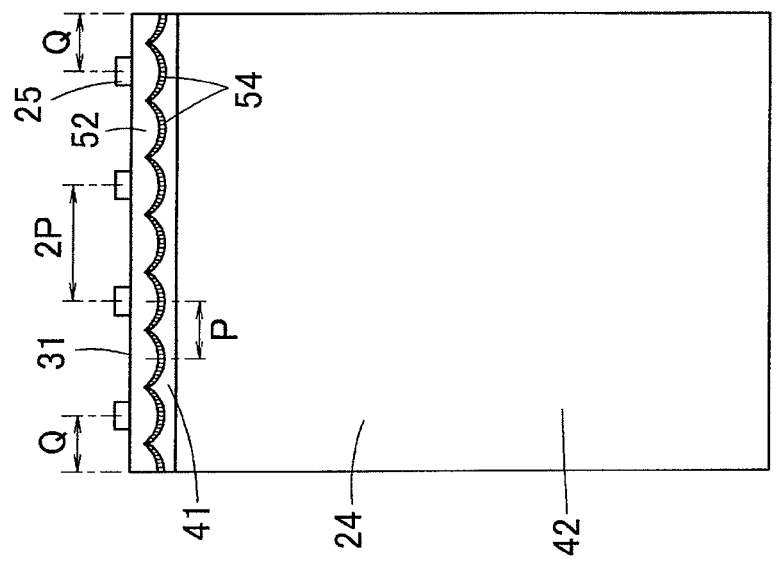

The light guide plate 24 of FIG. 20B is a case where the light guide plate of slightly smaller size is obtained with the light guide plate 24 of FIG. 20A as the original. Such light guide plate is cut such that the overhanging distance is A=2Q/3 (e.g., 4 mm). The corner of the light guide plate 24 is cut at the position facing the light source 25 at the end to form the inclined surface 43, and the inclination angle of the inclined surface 43 is optimized to maintain an even light emission.

Although not shown, an even light emitting luminance can be obtained even if the light guide plate is cut such that the overhanging distance is greater than the appropriate overhanging distance Q in such a mode by providing the reverse inclined surface 44, or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
    a light incident surface arranged facing a plurality of point light sources arrayed in a line;
    a light exit surface orthogonal to the light incident surface; and
    two side surfaces orthogonal to the light incident surface and the light exit surface,
    wherein light from the plurality of point light sources introduced from the light incident surface is diffused by a diffusion unit arranged on the light exit surface or a surface facing the light exit surface,
    wherein the light diffused by the diffusion unit exits from the light exit surface,
    wherein a distance between a point light source positioned at an end of the plurality of point light sources and the light incident surface is different from a distance between a point light source not positioned at the end of the plurality of point light sources and the light incident surface,
    wherein the plurality of point light sources are all directed in the same direction and are arranged on the same straight line, and
    wherein the distance between the joint light source positioned at the end and the light incident surface is defined so that an angle when an upper surface and a lower surface of the light incident surface are seen from the point light source is narrower than a spread angle of the light emitted from the point light source at a cross-section perpendicular to the light incident surface and the light exit surface.

2. The light guide plate according to claim 1, wherein the distance between the point light source positioned at the end and the light incident surface is differed according to a distance from the point light source positioned at the end to a side surface close to the point light source.

3. The light guide plate according to claim 1, wherein the distance between the point light source positioned at the end and the light incident surface is greater than the distance between the point light source not positioned at the end of the plurality of point light sources and the light incident surface.

4. The light guide plate according to claim 1, wherein the distance between the point light source positioned at the end and the light incident surface is smaller than the distance between the point light source not positioned at the end of the plurality of point light sources and the light incident surface.

5. The light guide according to claim 1,
    wherein the distance between the point light source positioned at the end and the light incident surface becomes greater toward a side surface close to the point light source.

6. The light guide plate according to claim 1, wherein the distance between the point light source positioned at the end and the light incident surface becomes smaller toward a side surface close to the point light source.

7. The light guide plate according to claim 1, wherein a position where the distance between the point light source positioned at the end and the light incident surface starts to change is within a region of the light incident surface facing a light emitting surface of the point light source positioned at the end.

8. The light guide plate according to claim 1, wherein a position where the distance between the point light source positioned at the end and the light incident surface starts to change is a position farther away from a side surface close to the point light source than a region of the light incident surface facing a light emitting surface of the point light source positioned at the end.

9. The light guide plate according to claim 1, wherein the light guide plate is cut to a desired dimension through an extracting construction method.

10. A liquid crystal display device comprising:
    an area light source device including a light guide plate according to claim 1, and
    a plurality of point light sources arrayed in a line facing the light incident surface of the light guide plate; and
    a liquid crystal panel arranged on the light exit surface side of the area light source device.

11. A method comprising:
    cutting at least one side surface of a light guide plate;
    arranging the light guide plate with a light incident surface thereof facing a plurality of point light sources arrayed in a line the light guide plate designed in advance to obtain an even luminance in an effective light emitting region when arranged with the light incident surface facing the plurality of point light sources arrayed in the line; and
    correcting an error from an even luminance in the effective light emitting region produced by cutting the at least one side surface by differing a distance between a point light source positioned at the end of the plurality of point light sources and the light incident surface from the distance before the cutting,
    wherein the plurality of point light sources are all directed in the same direction and are arranged on the same straight line, and
    wherein the distance between the point light source positioned at the end and the light incident surface is defined so that an angle when an upper surface and a lower surface of the light incident surface are seen from the point light source is narrower than a spread angle of the light emitted from the point light source at a cross-section perpendicular to the light incident surface and the light exit surface.

12. The method according to claim 11, wherein the distance between the point light source positioned at the end and the light incident surface is differed according to a distance from the point light source positioned at the end to a side surface close to the point light source.

13. The method according to claim 11, wherein the distance between the point light source positioned at the end and the light incident surface is greater than the distance between the point light source not positioned at the end of the plurality of point light sources and the light incident surface.

14. The method according to claim 11, wherein the distance between the point light source positioned at the end and the light incident surface is smaller than the distance between the point light source not positioned at the end of the plurality of point light sources and the light incident surface.

15. The method according to claim 11, wherein the distance between the point light source positioned at the end and the light incident surface becomes greater toward a side surface close to the point light source.

16. The method according to claim 11, wherein the distance between the point light source positioned at the end and the light incident surface becomes smaller toward a side surface close to the point light source.

17. The method according to claim 11, wherein a position where the distance between the point light source positioned at the end and the light incident surface starts to change is within a region of the light incident surface facing a light emitting surface of the point light source positioned at the end.

18. The method according to claim 11, wherein a position where the distance between the point light source positioned at the end and the light incident surface starts to change is a position farther away from a side surface close to the point light source than a region of the light incident surface facing a light emitting surface of the point light source positioned at the end.

19. The method according to claim 11, wherein the light guide plate is cut to a desired dimension through an extracting construction method.

20. The method of claim 11, further comprising: arranging a liquid crystal panel on the light exit surface side of an area light source device.

* * * * *